United States Patent
Lin

[11] Patent Number: 5,507,476
[45] Date of Patent: Apr. 16, 1996

[54] SHOCK-ABSORBING ASSEMBLY FOR BICYCLE SADDLE

[76] Inventor: Attain Lin, No. 209, Luentz S. Rd., Yung Feng Village, Peitour, Changhua Hsien, Taiwan

[21] Appl. No.: 395,104

[22] Filed: Feb. 27, 1995

[51] Int. Cl.⁶ .................................................. F16M 13/00
[52] U.S. Cl. ...................... 267/132; 267/166; 267/166.1; 297/209; 297/211
[58] Field of Search .................. 267/132, 131, 267/166, 166.1, 177, 178, 286–291, 142–146, 168, 179, 170; 297/208, 209, 210, 211, 212, 213, 214; 248/601, 623, 622, 600

[56] References Cited

U.S. PATENT DOCUMENTS

| | | | |
|---|---|---|---|
| 666,061 | 1/1901 | Naber | 267/132 |
| 684,350 | 10/1901 | Bunker | 267/132 |
| 1,229,353 | 6/1917 | Walker | 297/210 |
| 1,344,382 | 6/1920 | Condon | 297/210 |
| 1,474,977 | 11/1923 | Mesinger et al. | 267/132 |
| 1,546,909 | 7/1925 | Mesinger | 297/211 |
| 1,574,504 | 2/1926 | Mesinger | 297/210 |
| 1,848,286 | 3/1932 | Waldron | 267/132 |
| 2,013,624 | 9/1935 | Brandt | 297/210 |
| 2,030,809 | 2/1936 | Brandt | 297/210 |
| 2,066,225 | 12/1936 | Pryale et al. | 297/210 |
| 2,115,177 | 4/1938 | Pryale et al. | 297/210 |
| 2,225,316 | 12/1940 | Mesinger | 297/212 |
| 2,286,138 | 6/1942 | Kalter | 297/211 |
| 2,347,093 | 4/1944 | Faulhaber | 297/210 |
| 3,884,525 | 5/1975 | Mesinger | 297/212 |
| 4,850,643 | 7/1989 | Rollman | 297/212 |

FOREIGN PATENT DOCUMENTS

| | | | |
|---|---|---|---|
| 640393 | 9/1927 | France | 297/210 |
| 252840 | 4/1927 | Italy | 297/208 |
| 283456 | 1/1928 | United Kingdom | 297/210 |
| 529160 | 11/1940 | United Kingdom | 297/212 |

*Primary Examiner*—Douglas C. Butler
*Attorney, Agent, or Firm*—Browdy and Neimark

[57] ABSTRACT

An improved shock-absorbing assembly in combination with a bicycle saddle is equipped with a pair of vibration springs having two bell-shaped portions connected end to end and a receving groove is disposed at the junction thereof. A retaining member having a loop at each end thereof is engaged with the receiving groove of the vibration springs respectively. A tong-shaped supporting arm having its end bended into a loop is engaged with the receiving groove of the vibration springs which are securedly mounted onto a pair of fixing poles by nuts and washers. The front end of the supporting arm is inserted into a locking mount secured to the front end of the underside of a saddle so that the supporting arm is easily fixed in place and is dismounted from the saddle.

1 Claim, 7 Drawing Sheets

SHOCK-ABSORBING ASSEMBLY FOR BICYCLE SADDLE

BACKGROUND OF THE INVENTION

The present invention relates to an improved shock-absorbing assembly for use on a bicycle saddle. The present shock-absorbing assembly is provided with a retaining bracket engaged with a pair of vibration springs together with two ring-shaped terminals of a supporting arm having one end thereof removably secured to a fixing mount whereby the mounting of a shock-absorbing assembly to a bicycle saddle can be easily completed.

In general, the saddle of a bicycle is equipped with a shock-absorbing assembly which is engaged with the underside of a saddle, making a rider comfortable in riding on a bumpy road. There are two types of conventional shock-absorbing assembly illustrated in FIGS. 1, 2, and FIGS. 3, 4 respectively.

Referring to FIGS. 1, 2, the first kind of shocking-absorbing assembly is comprised of a pair of vibration springs 50 mounted onto a pair of mounting poles 61 having the ends thereof provided with threads 611 and 612 respectively so as to permit the vibration springs 50 to be locked in place by nuts 63. Each pole 61 is secured to a saddle 10 by way of a hole 12. A cuff-shaped retaining piece 40 having a ring 43 at each end thereof and two small holes 42 disposed therebetween. The retaining piece 40 is engaged with the vibration springs 50 at the middle of the springs 50 mounted onto the mounting poles 61. A pair of supporting pieces 30 having a bended end 33 having a hole 34 in correspondence to the hole 42 of the retaining piece 40 are engaged with the retaining piece 40 by rivets 62. The other end of the supporting piece 30 has a locking hole 31 engaged with an L-shaped fixing plate 20 having two engaging lugs 22 at each side of a vertical portion and a round hole 21 at the horizontal portion thereof. The fixing plate 20 is secured to a bolt 60 at the underside of the saddle by a nut 63 and a washer 64. The locking holes 31 of the two supporting pieces 30 are engaged with the lugs 22 of the vertical portion of the L-shaped fixing plate 20 respectively. The completed assembly of the saddle of FIG. 1 is illustrated in FIG. 2.

Referring to FIGS. 3, 4, the other conventional shock-absorbing assembly is shown. The two supporting pieces 30 of the first prior art is replaced by a tong-shaped supporting piece 70 having a front end 71 and two separate legs 72. The L-shaped fixing plate 20 is replaced by a retaining block 13 having a cavity 131 for the insertion of the front end 71 of the supporting piece 70 and a hook 132 with which the front end 71 is engaged. The ends of the separate legs 72 are secured to the connection 41 of the cuff-shaped retaining piece 40 by welding, as shown in FIG. 4.

SUMMARY OF THE INVENTION

The primary object of the present invention is to provide an improved shock-absorbing assembly which is easy to be mounted to and dismounted from a bicycle saddle.

Another object of the present invention is to provide a shock-absorbing assembly which is cheap to produce.

DETAILED DESCRIPTION OF THE PREFERRED EMBODIMENT

Figure 1:
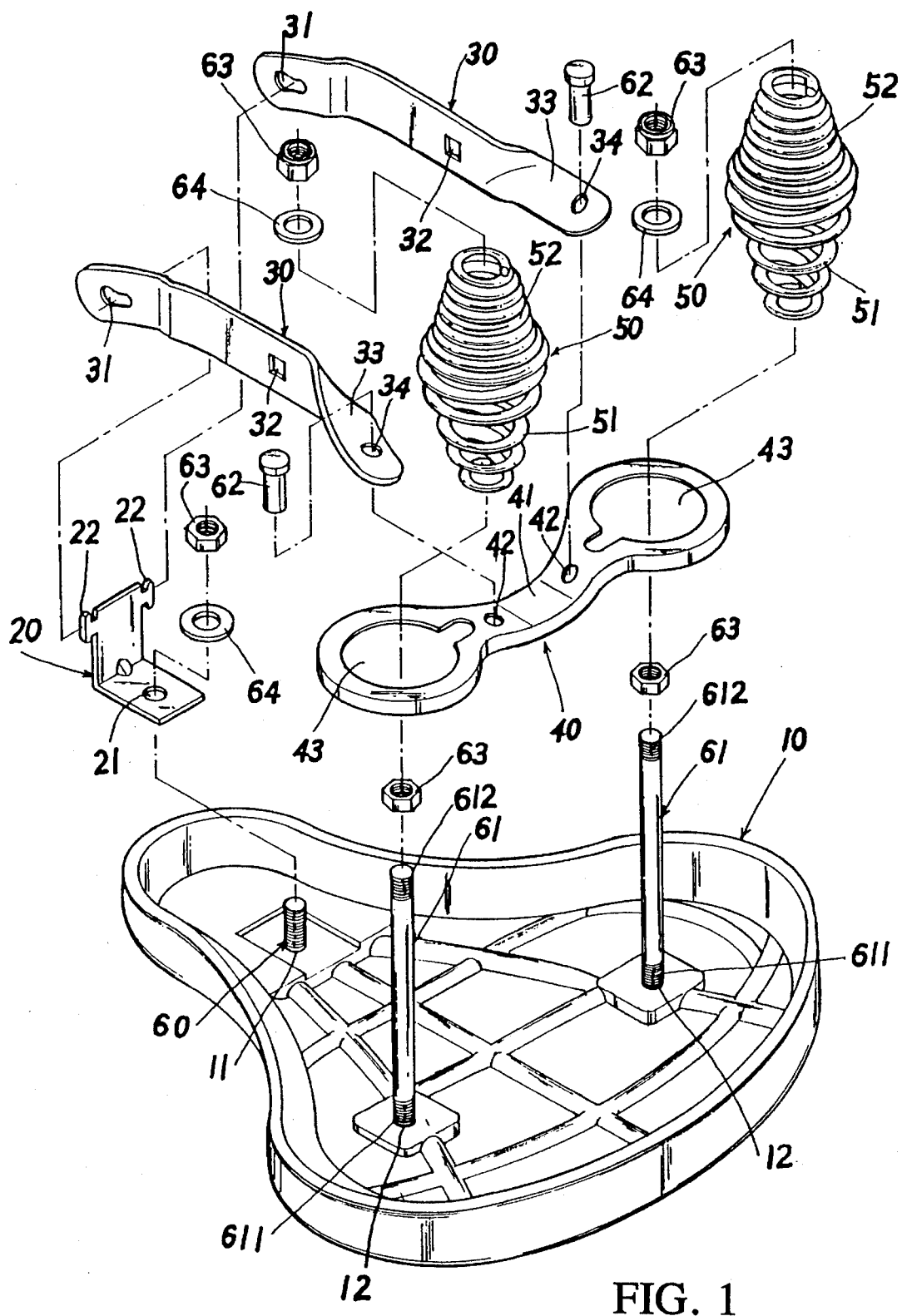
FIG. 1 is a perspective diagram showing the exploded components of a first conventional shock-absorbing assembly of a bicycle saddle.
Figure 2:
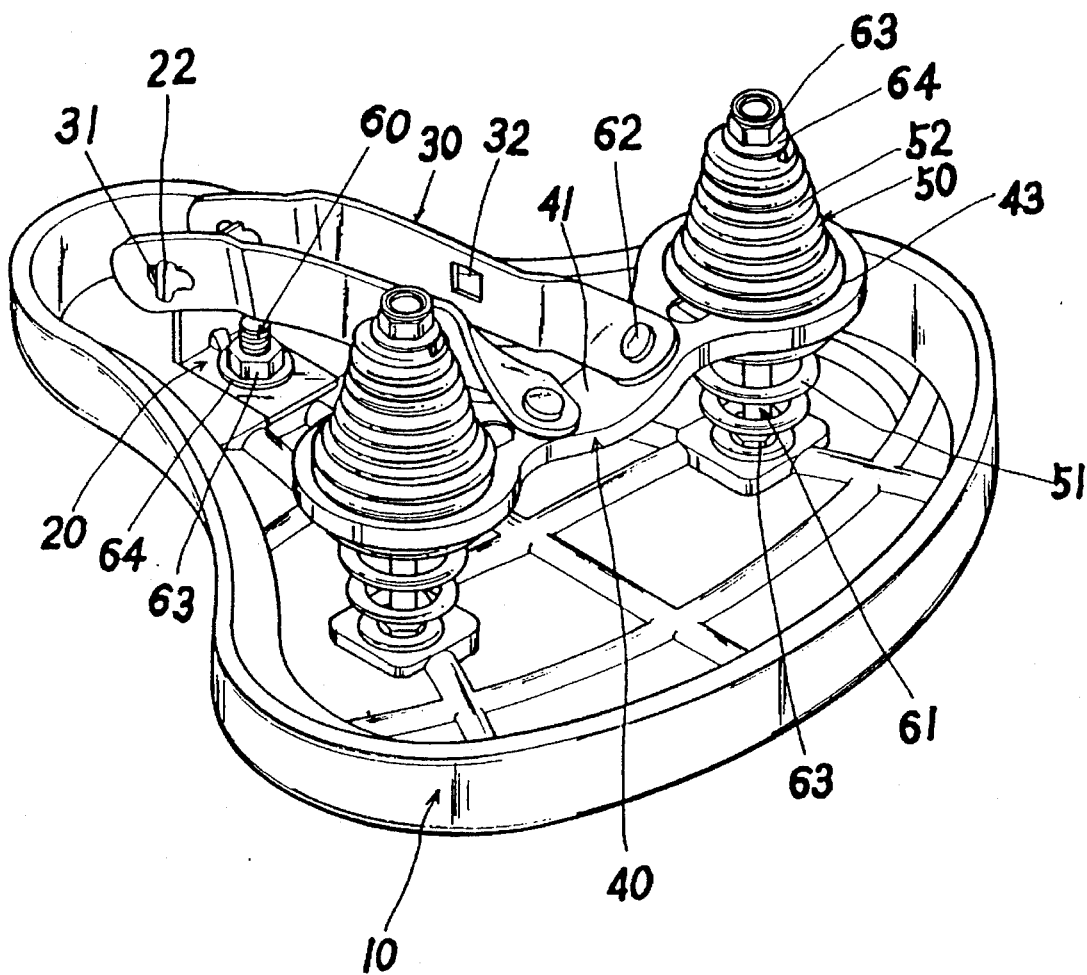
FIG. 2 is a diagram showing the assembly of the bicycle saddle of FIG. 1 with the shock-absorbing assembly engaged therewith.
Figure 3:
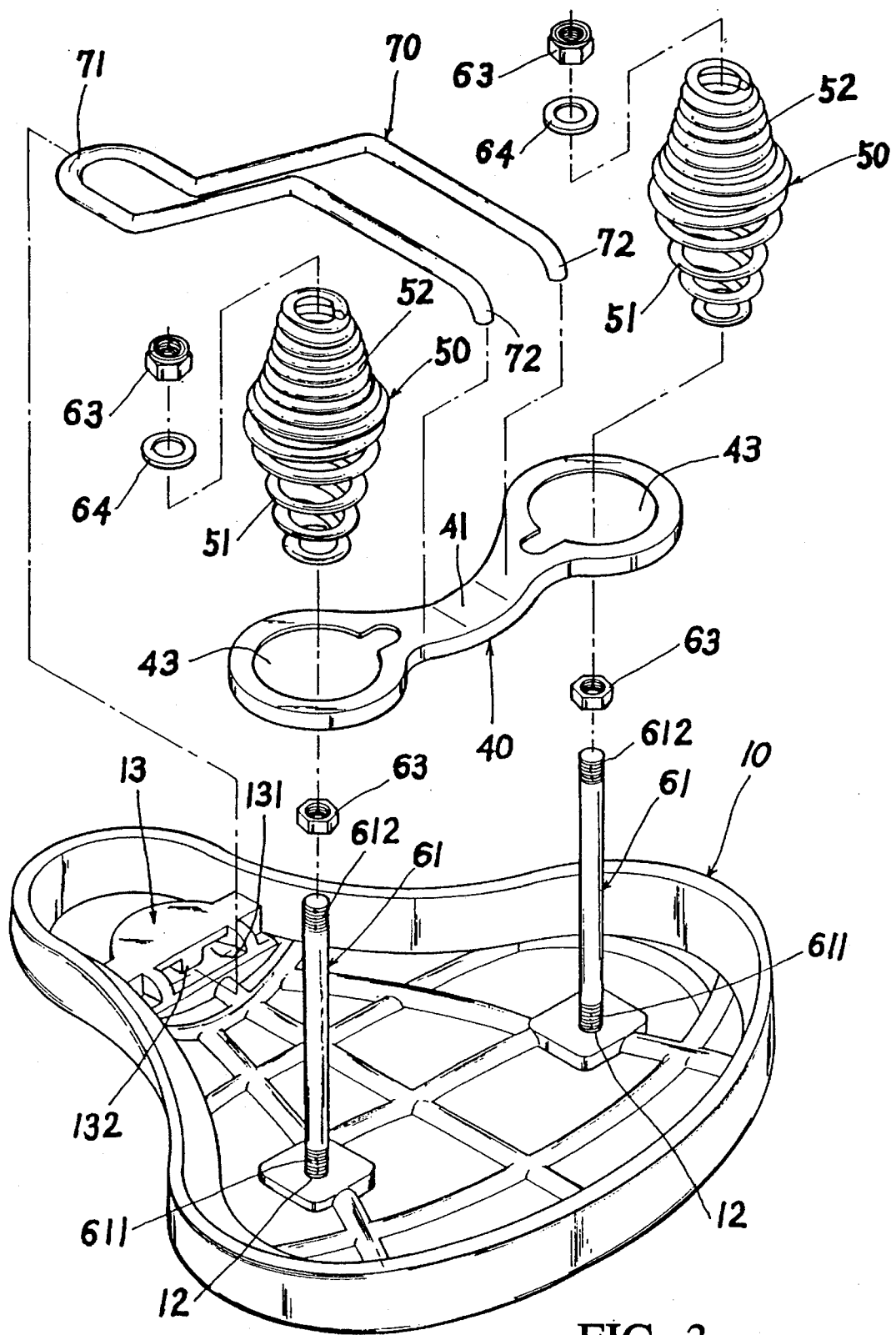
FIG. 3 is a perspective diagram showing the exploded components of a second conventional shock-absorbing assembly of a bicycle saddle.
Figure 4:
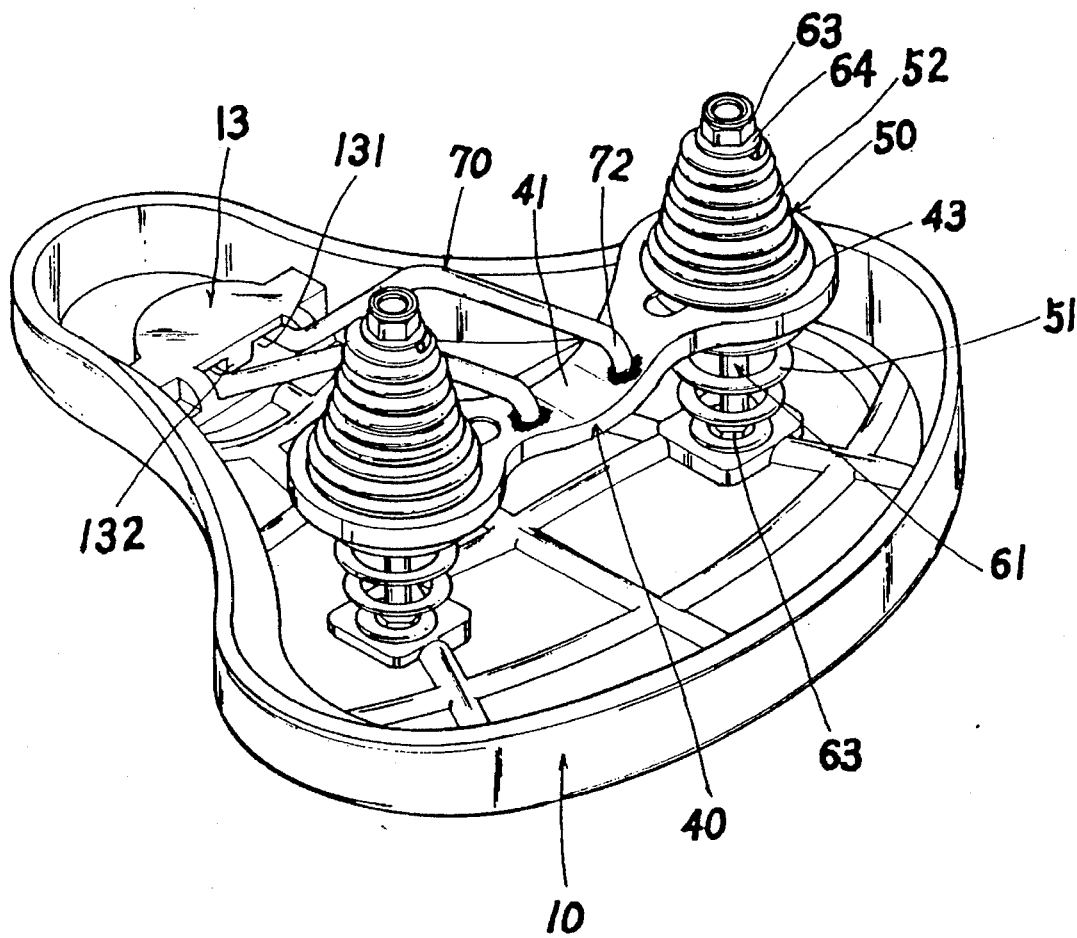
FIG. 4 is a diagram showing the assembly of the bicycle saddle of FIG. 3 with the shock-absorbing assembly engaged therewith.
Figure 5:
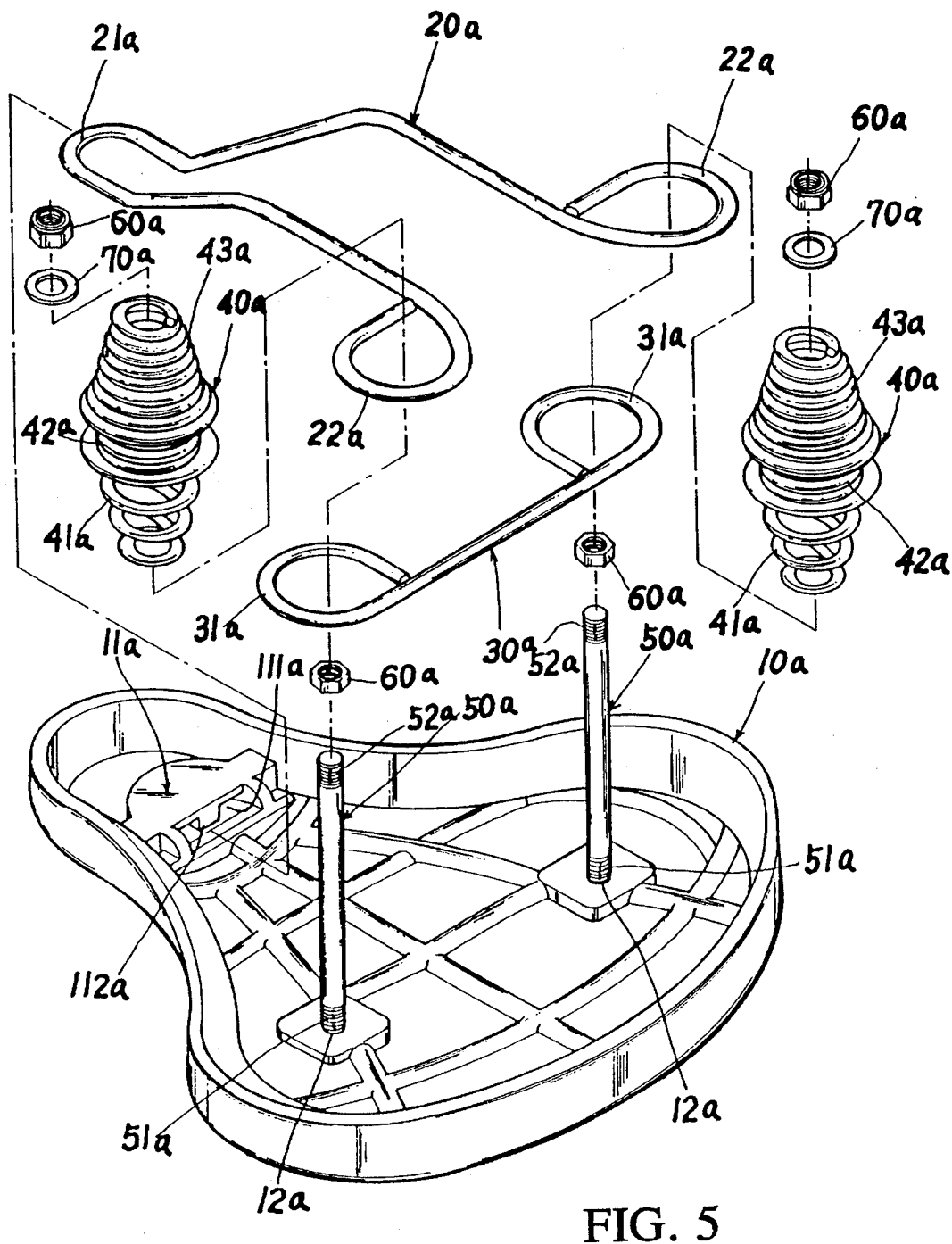
FIG. 5 is a perspective diagram showing the exploded components of the present invention.
Figure 6:
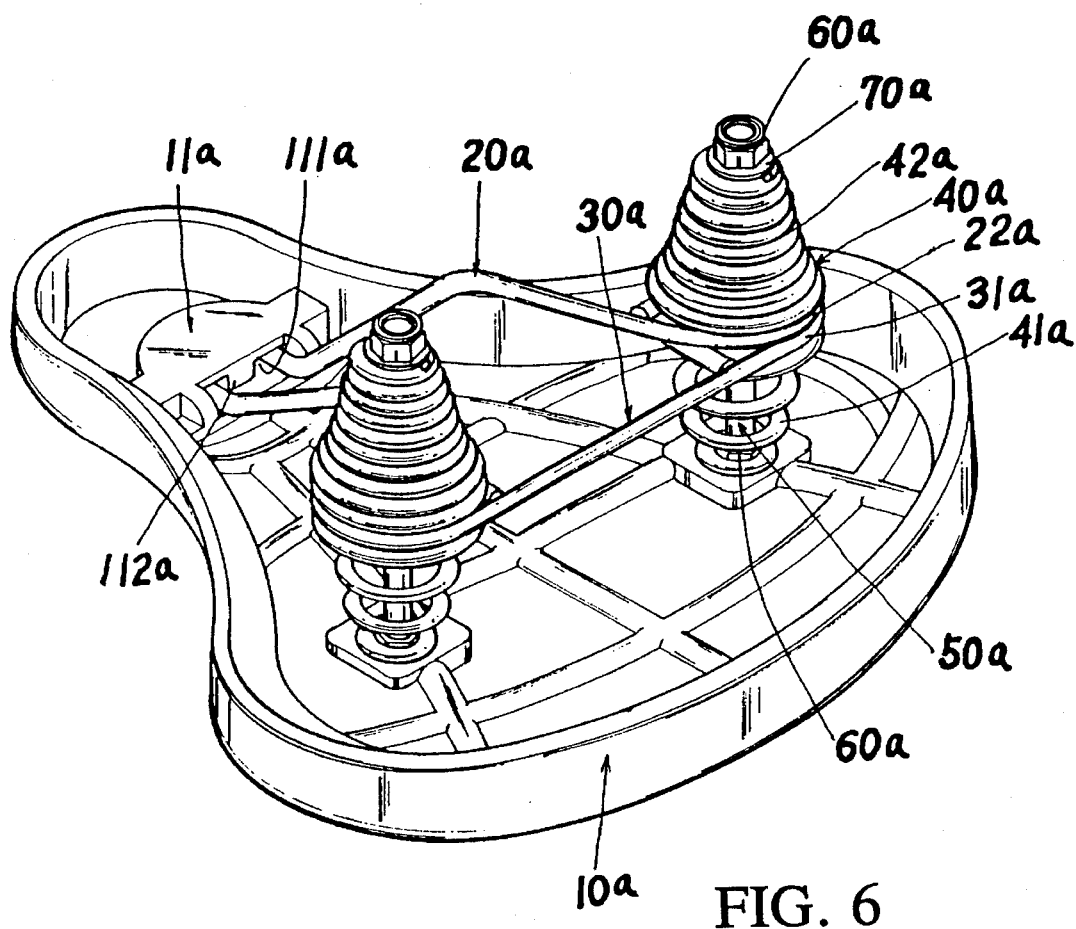
FIG. 6 is a diagram showing the whole structure of the bicycle saddle with the shock-abosrbing assembly of the present invention.
Figure 7:
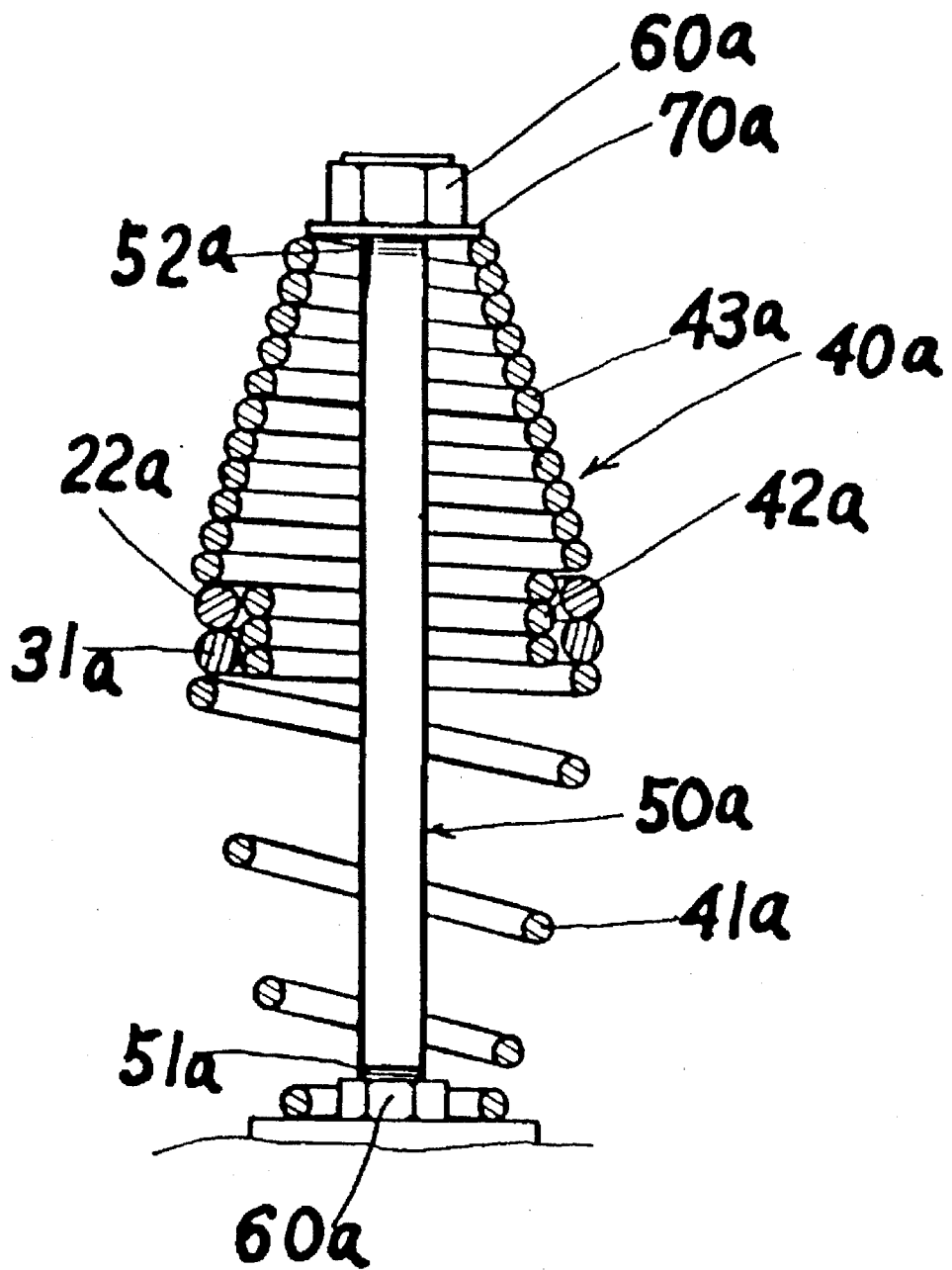
FIG. 7 is a sectional view showing the engagement of the end of the supporting arm and a retaining bracket with the vibration springs.

Referring to FIGS. 5, 6, the exploded components of a saddle of the present invention disposed upside down is illustrated. The saddle of the present invention has a saddle embodiment 10a to which a pair of mounting poles 50a are removably secured. Each mounting pole 50a has a threaded upper end 52a and lower end 51a. A tong-shaped supporting arm 20a has a front end 21a and a pair of loops 22a at the other split end. A retaining member 30a having an engagement loop 31a at each end. A pair of vibration springs 40a having a bell-shaped upper portion 43a and a bell-shaped lower portion 41a with a receiving groove 42a disposed therebetween.

A locking mount 11a having a recess 111a for the insertion of the front end 21a of the supporting arm 20a and an engagement hook 112a which can retain the front end 21a in place.

In assembly, each mounting pole 50a is first engaged with a hole 12a of the saddle 10a and is further secured in place by a nut 60a. The loops 22a of the supporting arm 20a are first snapped into the receiving grooves 42a of the vibration springs 40a from the lower portion 41a respectively; then the engagement loops 31a of the retaining member 30a are fitted into the receiving groove 42a of the vibration springs 40a from the bottom portion 41a.

Afterwards, the front end 21a of the supporting arm 20a is engaged with the recess 111a of the locking mount 11a, and further engaged with the engagement hook 112a. The vibration springs 40a are engaged with the mounting poles 50a from the lower portion 41a of the vibration spring. At the final stage, nuts 60a and washers 70a are applied to the threaded top end of the mounting pole 50a in such a manner that the vibration springs 40a are tightly secured in place to the saddle embodiment.

I claim:

1. Improved shock-absorbing assembly in combination with a bicycle saddle having a pair of mounting poles removably secured to a saddle construction, a tong-shaped supporting arm, a retaining member, a pair of vibration springs removably mounted onto said mounting poles; said retaining member and said supporting arm being engaged with both said vibration springs; said supporting arm being engaged with a mounting means at another end; wherein the improvement is characterized by that said tong-shaped supporting arm has two symmetric looped ends and said retaining member has loops at each end thereof; and each of said vibration springs has a receiving groove at the middle section thereof so that said looped ends of said supporting arm and said retaining member can be engaged with said vibration springs and respectively confined in said receiving grooves; said vibration springs are mounted onto a pair of mounting poles disposed on said saddle construction and said supporting arm being further engaged with said locking mount disposed on said saddle construction; said vibration springs being secured in place to said mounting poles by nuts.

* * * * *